(12) United States Patent
Chen

(10) Patent No.: US 12,479,340 B2
(45) Date of Patent: Nov. 25, 2025

(54) CHILD SAFETY SEAT

(71) Applicant: WONDERLAND SWITZERLAND AG, Steinhausen (CH)

(72) Inventor: Yingzhong Chen, Guangdong (CN)

(73) Assignee: WONDERLAND SWITZERLAND AG, Steinhausen (CH)

( * ) Notice: Subject to any disclaimer, the term of this patent is extended or adjusted under 35 U.S.C. 154(b) by 176 days.

(21) Appl. No.: 18/304,170

(22) Filed: Apr. 20, 2023

(65) Prior Publication Data
US 2023/0347799 A1   Nov. 2, 2023

(30) Foreign Application Priority Data

Apr. 28, 2022   (CN) .......................... 202210470360.2

(51) Int. Cl.
*B60R 22/00* (2006.01)
*B60N 2/26* (2006.01)
*B60N 2/28* (2006.01)
*B60N 2/42* (2006.01)

(52) U.S. Cl.
CPC ................................. *B60N 2/2803* (2013.01)

(58) Field of Classification Search
CPC ... B60N 2/2812; B60N 2/2884; B60N 2/2809
See application file for complete search history.

(56) References Cited

U.S. PATENT DOCUMENTS

| | | | |
|---|---|---|---|
| 5,653,504 A | 8/1997 | Henson | |
| 6,619,752 B1 * | 9/2003 | Glover | B60R 22/28 |
| | | | 280/805 |
| 7,083,237 B2 | 8/2006 | Horton et al. | |
| 7,448,690 B2 | 11/2008 | Blackmon | |
| 8,496,293 B2 * | 7/2013 | Gaudreau, Jr. | B60N 2/2809 |
| | | | 297/254 |
| 8,991,935 B2 * | 3/2015 | Balensiefer, II | B60N 2/2812 |
| | | | 297/470 |
| 9,714,002 B2 * | 7/2017 | Cheng | B60N 2/2812 |
| 2012/0181828 A1 * | 7/2012 | Cheng | B60N 2/2809 |
| | | | 297/250.1 |
| 2019/0232827 A1 * | 8/2019 | Maciejczyk | B60N 2/2803 |
| 2020/0391625 A1 * | 12/2020 | Williams | B60N 2/2821 |

(Continued)

FOREIGN PATENT DOCUMENTS

| | | |
|---|---|---|
| AU | 2013270461 A1 | 6/2014 |
| CN | 109987004 A | 7/2019 |

(Continued)

OTHER PUBLICATIONS

Taiwan Office Action issued in corresponding Taiwan Application No. 112114662, dated Sep. 28, 2023, pp. 1-42.

(Continued)

*Primary Examiner* — Shin H Kim
(74) *Attorney, Agent, or Firm* — HAUPTMAN HAM, LLP

(57) ABSTRACT

The present disclosure discloses a child safety seat. The child safety seat includes a seat body, a safety tether, and a buffering structure. The safety tether includes a fixing part and a connecting part. The fixing part is fixed on the seat body. The connecting part is connected to a vehicle seat. The buffering structure is disposed on the safety tether or the seat body to reduce a tension force applied on the safety tether.

20 Claims, 17 Drawing Sheets

(56) References Cited

U.S. PATENT DOCUMENTS

2023/0347799 A1* 11/2023 Chen .................... B60N 2/2803
2024/0001824 A1* 1/2024 Coffman .............. B60N 2/2887

FOREIGN PATENT DOCUMENTS

| CN | 214728337 U | 11/2021 |
| CN | 215322122 U | 12/2021 |
| EP | 2177395 A1 | 4/2010 |
| TW | 202128459 A | 8/2021 |
| TW | I816147 B | 9/2023 |

OTHER PUBLICATIONS

Australian Office Action issued in corresponding Australian Application No. 2023202404, dated Apr. 10, 2024, pp. 1-5.

* cited by examiner

CHILD SAFETY SEAT

CROSS REFERENCE TO RELATED APPLICATION

This application claims priority to Chinese Patent Application No. 2022104703602, filed on Apr. 28, 2022, the entire content of which is incorporated herein in its entirety.

TECHNICAL FIELD

The present disclosure relates to the technical field of safety seats, and in particular, to a child safety seat.

BACKGROUND

Existing child safety seats can be fixed to vehicle seats by arranging safety tethers. When a vehicle is subjected to an impact force, the safety tether can prevent the displacement of the child safety seat to a certain extent. However, when the vehicle is subjected to a relatively large impact force, the safety tether may exert a large tensile force applied on the child safety seat, causing the safety tether and/or a connection between the safety tether and the vehicle seat to be deformed and/or broken, such that the safety tether cannot limit the position of the child safety seat, resulting in potential safety hazards.

SUMMARY

According to various embodiments of the present disclosure, a child safety seat is provided.

A child safety seat includes: a seat body; a safety tether including a fixing part and a connecting part, the fixing part being fixed on the seat body, and the connecting part being connected to a vehicle seat; and a buffering structure disposed on the safety tether or the seat body to reduce a tension force applied on the safety tether.

In an embodiment, the buffering structure includes an elastic pressing block, and both the safety tether and the seat body abut against the elastic pressing block.

In an embodiment, the child safety seat further includes a fixing member. The fixing member is disposed in the seat body. The elastic pressing block includes a first pressing block. The fixing part includes a fixing collar. The fixing collar is sleeved on the fixing member. Both the fixing collar and the fixing member abut against the first pressing block.

In an embodiment, the elastic pressing block further includes a second pressing block. Each of the fixing member, the seat body, and the safety tether abuts against the second pressing block.

In an embodiment, the elastic pressing block is made of rubber, silicon, polyvinyl chloride, polystyrene foam, expanded polypropylene, or expanded polystyrene-polyethylene mixture.

In an embodiment, the elastic pressing block includes a first buffering part and a second buffering part. The first buffering part is sleeved on the second buffering part. Both the safety tether and the seat body abut against the first buffering part.

In an embodiment, the elastic deformation capacity of the second buffering part is greater than that of the first buffering part.

In an embodiment, a first connecting part and a second connecting part are arranged on the safety tether and spaced from each other. The first connecting part and the second connecting part are connected and fixed to form the buffering structure.

In an embodiment, the first connecting part and the second connecting part are fixedly connected by sewing, to form the buffering structure.

In an embodiment, a plurality of first connecting parts and a plurality of second connecting parts are provided. The plurality of first connecting parts and the plurality of second connecting parts are connected and fixed in one-one correspondence, to form a plurality of buffering structures.

In an embodiment, a first connecting section, a second connecting section, and a third connecting section are disposed on the safety tether. The first connecting section, the second connecting section, and the third connecting section are connected and fixed to form the buffering structure.

In an embodiment, the first connecting section is superposed on a surface of the second connecting section, and the third connecting section is superposed on another surface of the second connecting section.

In an embodiment, the safety tether includes a fixing webbing and a connecting webbing. The fixing webbing and the connecting webbing are connected by a length adjusting member. An end of the fixing webbing away from the length adjusting member is disposed with the fixing part. An end of the connecting webbing away from the length adjusting member is disposed with the connecting part. The length adjusting member is configured to adjust the length of a portion of the connecting webbing between the connecting part and the length adjusting member.

In an embodiment, the buffering structure is disposed on the fixing webbing.

In an embodiment, the buffering structure is disposed on the connecting webbing, and located between the connecting part and the length adjusting member.

In an embodiment, the child safety seat further includes a fixed tube disposed on the seat body. The safety tether is wound around the fixed tube to connect to the vehicle seat. The buffering structure is a notch disposed on the fixed tube.

In an embodiment, the child safety seat further includes a fixed tube disposed on the seat body. The safety tether is wound around the fixed tube to connect to the vehicle seat. The buffering structure is a first buffering pressing block disposed on the fixed tub. The safety tether abuts against the first buffering pressing block.

In an embodiment, the child safety seat further includes a fixed tube disposed on the seat body. The safety tether is wound around the fixed tube to connect to the vehicle seat. A limiting ring is disposed on the fixed tube. A limiting collar is disposed on the safety tether. When the safety tether is wound around the fixed tube, the limiting collar is engaged at the limiting ring. The buffering structure is a second buffering pressing block disposed on the limiting ring. A through hole is disposed on the second buffering pressing block. The safety tether extends out from the through hole when winding around the fixed tube.

In an embodiment, the seat body includes a mounting cavity, and a mounting hole communicating with the mounting cavity. A fixing member is disposed in the mounting cavity. An end of the safety tether including the fixing part extends into the mounting cavity through the mounting hole, to be fixed on the fixing member. The buffering structure is a third buffering pressing block disposed around the mounting hole. The safety tether abuts against the third buffering pressing block.

In an embodiment, the safety tether includes a fixing webbing and a connecting webbing. The fixing webbing and the connecting webbing are connected by a length adjusting member. An end of the fixing webbing away from the length adjusting member is disposed with a fixing part. An end of the connecting webbing away from the length adjusting member is disposed with the connecting part. The length adjusting member is configured to adjust the length of a portion of the connecting webbing between the connecting part and the length adjusting member. A width of the fixing webbing is less than a width of the connecting webbing, so that the fixing webbing forms the buffering structure.

In an embodiment, the width of the fixing webbing is in a range from 15 mm to 30 mm.

Figure 1:
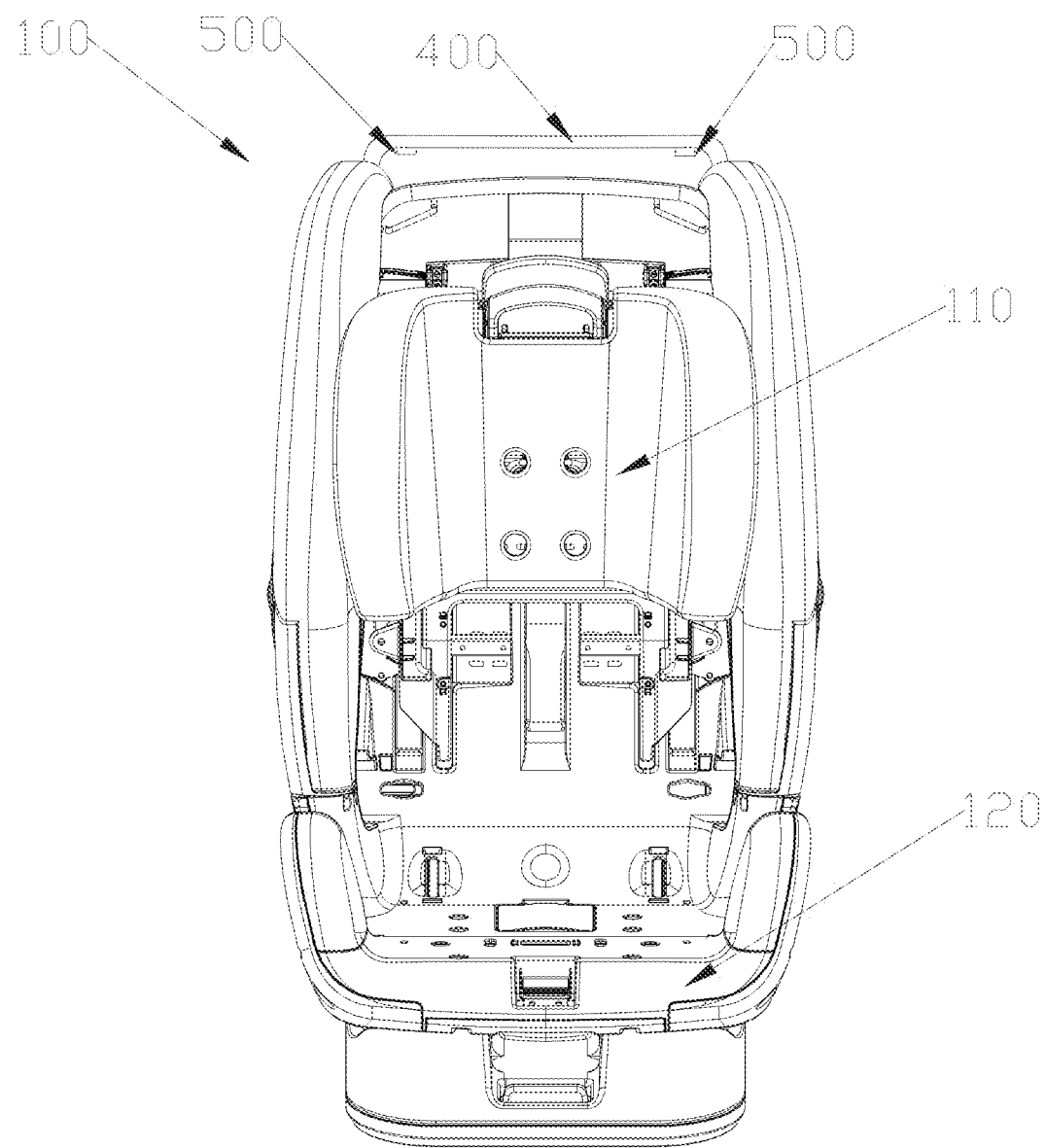
FIG. 1 is a structural schematic view of a child safety seat according to an embodiment of the present disclosure.

ILLUSTRATION FOR REFERENCE SIGNS 100, seat body; 110, seat back; 111, mounting cavity; 120, seated portion; 200, fixing member; 300, safety tether; 310, connecting webbing; 311, use section; 311a, first section; 311b, second section; 312, adjusting section; 320, fixing webbing; 321, sleeving collar; 322, limiting collar; 330, length adjusting member; 331, sleeved portion; 332, adjusting part; 333, adjusting button; 340, fixing part; 350, connecting part; 360, auxiliary webbing; 370, auxiliary fixing part; 400, fixed tube; 410, horizontal tube; 420, first side tube; 430, second side tube; 500, limiting ring; 610, elastic pressing block; 611, first pressing block; 611a, first buffering part; 611b, second buffering part; 612, second pressing block; 612a, first surface; 612b, second surface; 612c, third surface; 620, first connecting structure; 621, first connecting part; 622, second connecting part; 630, second connecting structure; 631, first connecting section; 632, second connecting section; 633, third connecting section; 640, notch; and 700, first buffering pressing block.

DETAILED DESCRIPTION OF THE EMBODIMENTS

In order to make the object, technical solution and advantages of the present disclosure clearer, the present disclosure will be further described in detail below in conjunction with the accompanying drawings and specific implementation methods. It should be understood that the specific embodiments described herein are only used to explain the present disclosure, and do not limit the protection scope of the present disclosure.

It should be noted that when an element is referred to as being "fixed" to another element, it can be directly on the other element or an intermediate element may also be present. When an element is referred to as being "connected to" another element, it can be directly connected to the other element or an intermediate element may also be present. The terms "vertical," "horizontal," "left," "right," and similar expressions are used herein for purposes of illustration only and are not intended to represent the only embodiments.

Unless otherwise defined, all technical and scientific terms used herein have the same meaning as commonly understood by one of ordinary skill in the technical field of the present disclosure. The terminology used herein in the description of the present disclosure is only for the purpose of describing specific embodiments, and is not intended to limit the present disclosure. As used herein, the term "and/or" includes any and all combinations of one or more of the associated listed items.

As shown in FIGS. 1, 4, 7, and 9, an embodiment of the present disclosure provides a child safety seat. The child safety seat includes a seat body 100, a fixing member 200, a safety tether 300, a fixed tube 400, a limiting ring 500, and a buffering structure. The child safety seat can well ensure the effect of the safety tether 300 even when a vehicle is subjected to a relatively large impact force, and has high safety.

Figure 4:
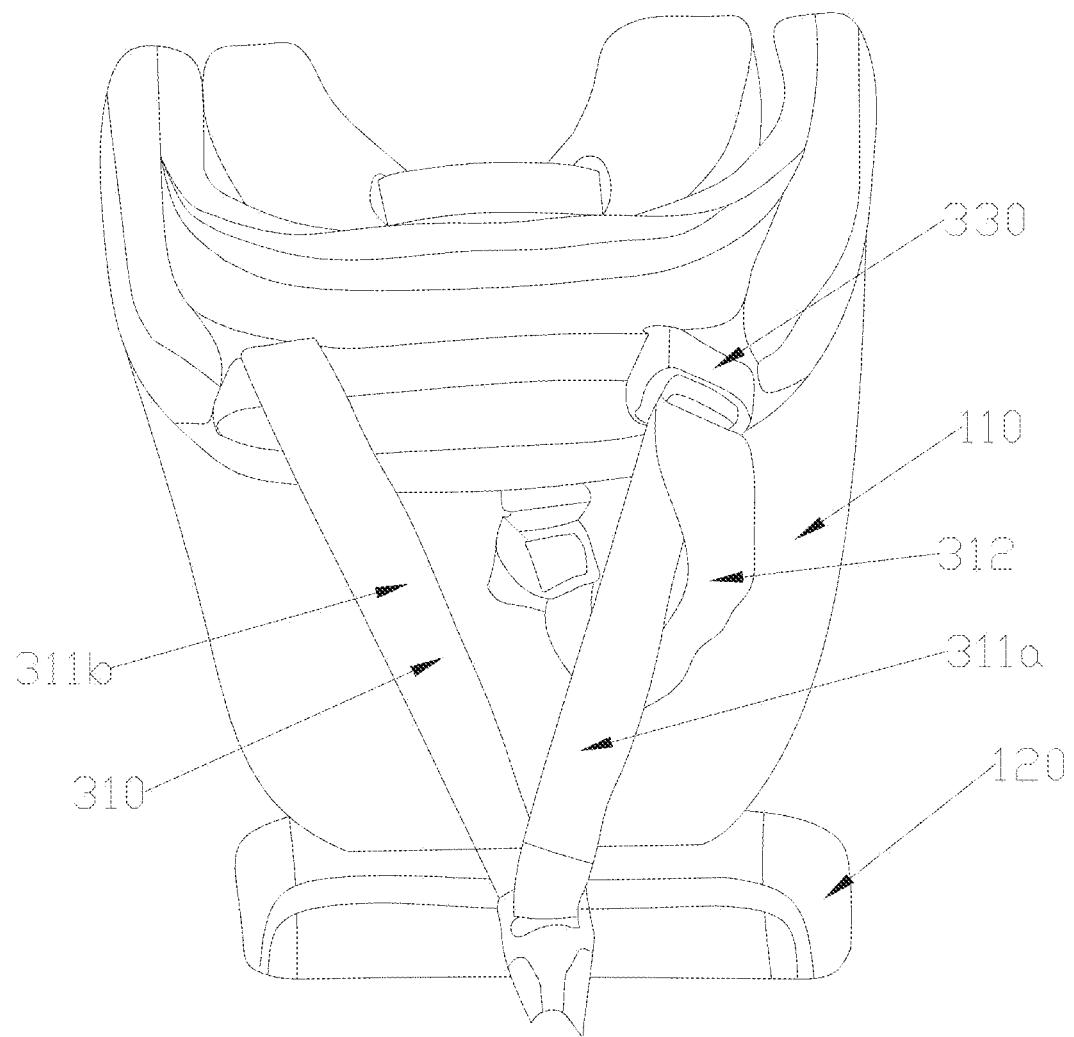
FIG. 4 is a structural schematic view of a child safety seat according to an embodiment of the present disclosure, from another perspective.
Figure 6:
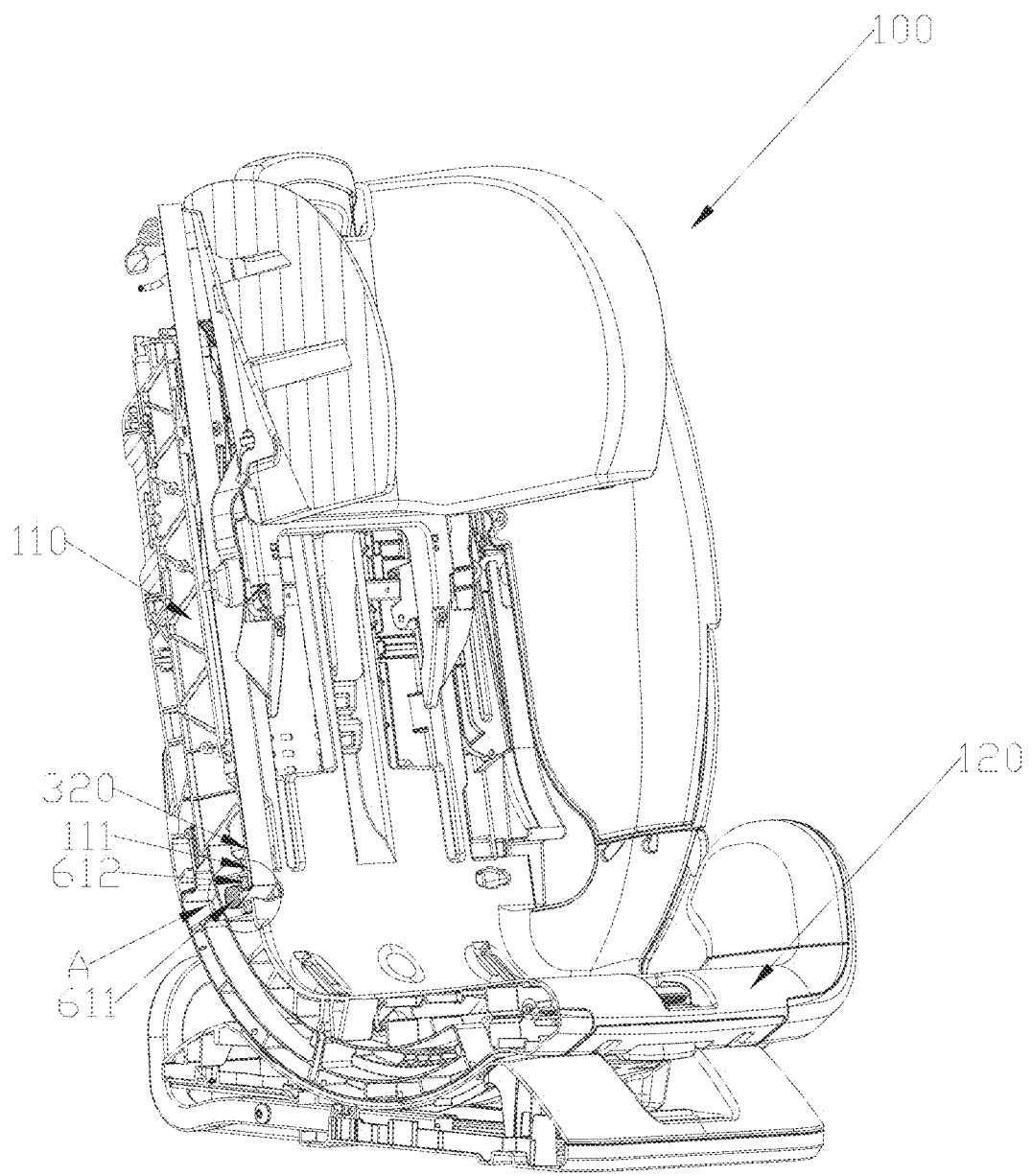
FIG. 6 is a partial cross-sectional view of the child safety seat shown in FIG. 1.
Figure 7:
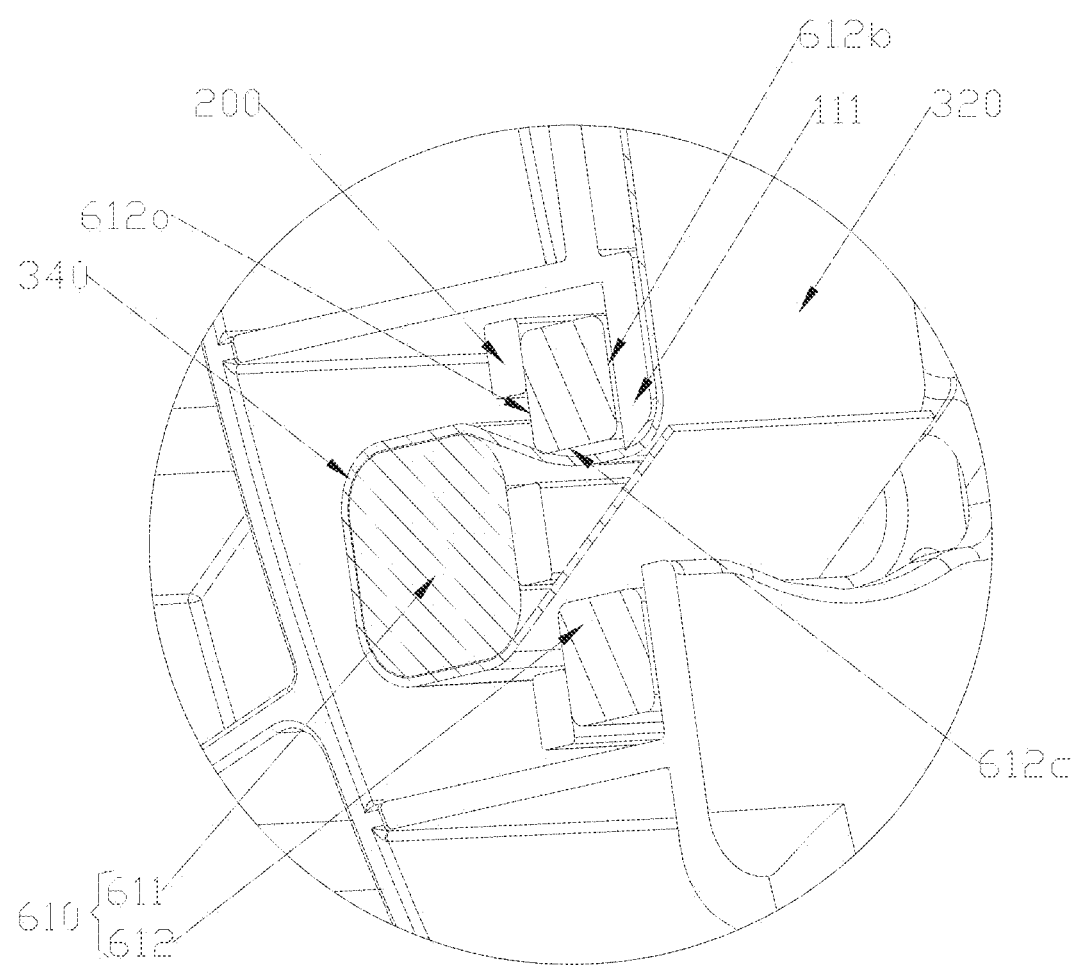
FIG. 7 is an enlarged view of a portion A shown in FIG. 6.

Specifically, as shown in FIGS. 1 and 4, the seat body 100 includes a seat back 110 and a seated portion 120 that are connected to each other. As shown in FIGS. 6 and 7, the seat back 110 is disposed with a mounting cavity 111, and a mounting hole and a communicating hole that communicates with the mounting cavity 111. The communicating hole is located above the mounting hole. The fixing member 200 is disposed in the mounting cavity 111. In this embodiment, the fixing member 200 is an iron sheet in a shape of a Chinese character "凵". Certainly, in other embodiments, the fixing member 200 may also be in other forms.

Specifically, as shown in FIGS. 9 to 12, the safety tether 300 includes a connecting webbing 310, a fixing webbing 320, and a length adjusting member 330. The connecting webbing 310 and the fixing webbing 320 are connected by the length adjusting member 330. An end of the fixing webbing 320 away from the length adjusting member 330 is disposed with a fixing part 340. An end of the connecting webbing 310 away from the length adjusting member 330 is disposed with a connecting part 350. The length adjusting member 330 is used for adjusting the length of a portion of the connecting webbing 310 between the connecting part 350 and the length adjusting member 330. The fixing part 340 is fixed on the seat body 100, and the connecting part 350 is connected to a vehicle seat. An end of the safety tether 300 including the fixing part 340 extends into the mounting cavity through the mounting hole, to be fixed on the fixing member 200. In this way, a connection between the seat body 100 and the vehicle seat can be realized through the safety tether 300. In this embodiment, the fixing part 340 is a fixing collar. Certainly, in other embodiments, the fixing part 340 may also be a buckle in a shape of a Chinese character "冂", a hook, and the like. In this embodiment, the connecting part 350 is a hook. Certainly, in other embodiments, the connecting part 350 may also be a fixing collar, a buckle in a shape of the Chinese character "凵", and the like.

Figure 9:
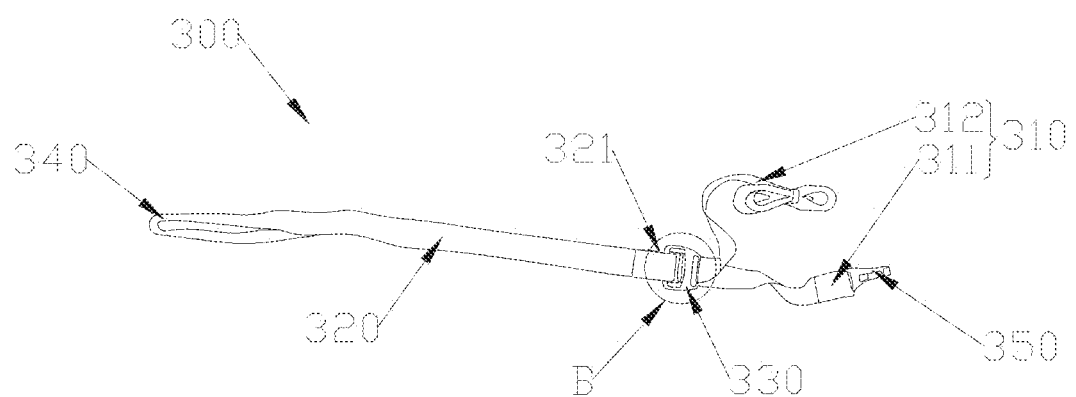
FIG. 9 is a structural schematic view of a safety tether according to an embodiment of the present disclosure.
Figure 10:
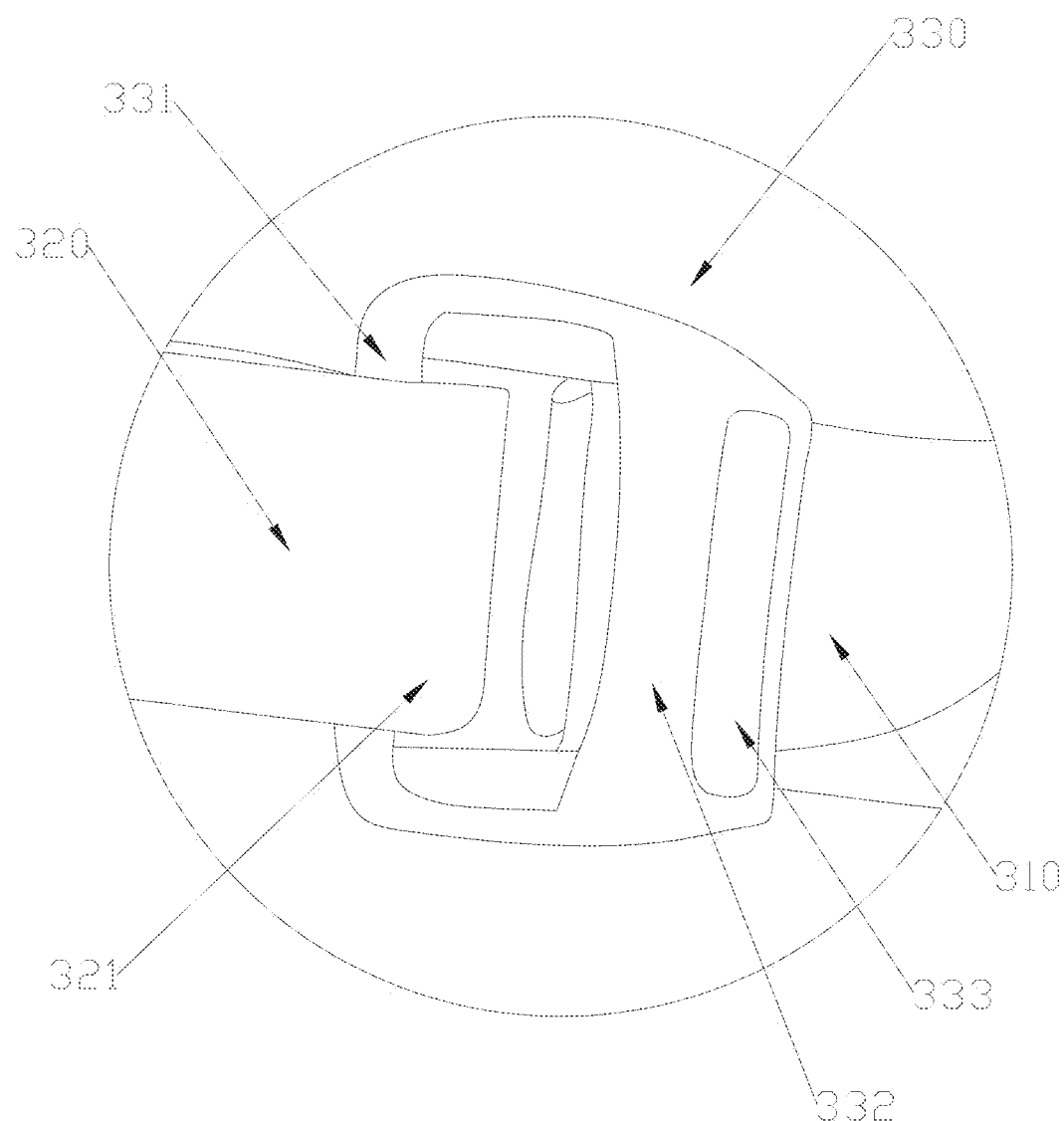
FIG. 10 is an enlarged view of a portion B shown in FIG. 9.

In this embodiment, as shown in FIGS. 9 and 10, an end of the fixing webbing 320 away from the fixing part 340 is fixed on the length adjusting member 330. Specifically, a sleeved portion 331 may be provided on the length adjusting member 330, and a sleeving collar 321 may be disposed at the end of the fixing webbing 320 away from the fixing part 340, and the sleeving collar 321 is sleeved and fixed on the sleeved portion 331. The connecting webbing 310 is adjustably disposed on the length adjusting member 330. Specifically, an adjusting part 332 and an adjusting button 333 may be disposed on the length adjusting member 330, and the connecting webbing 310 extends through the adjusting part 332. In this way, the connecting webbing 310 can be divided into a use section 311 and an adjusting section 312 with the adjusting part 332 as a boundary. A portion of the connecting webbing 310 between the adjusting part 332 and the connecting part 350 is referred to as the use section 311, and the other portion of the connecting webbing 310 is referred to as the adjusting section 312. When the adjusting button 333 is in a locked state, the adjusting part 332 presses the connecting webbing 310, and the length of the portion of the connecting webbing 310 between the connecting part 350 and the length adjusting member 330 is constant. The adjusting button 333 can be pressed to switch from the locked state to an unlocked state, the adjusting part 332 releases the pressing on the connecting webbing 310, such that the length of the portion of the connecting webbing 310 between the connecting part 350 and the length adjusting member 330 can be adjusted.

Figure 11:
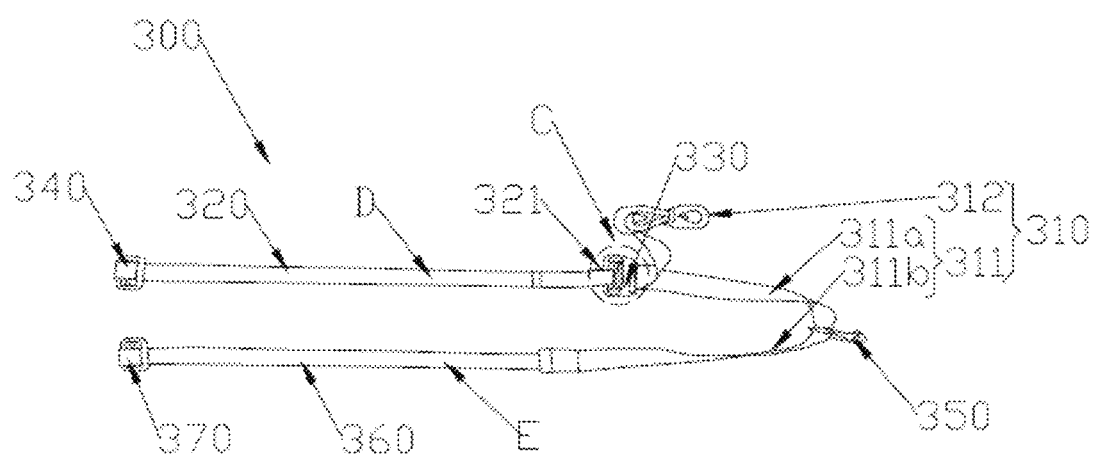
FIG. 11 is a structural schematic view of a safety tether according to another embodiment of the present disclosure.
Figure 12:
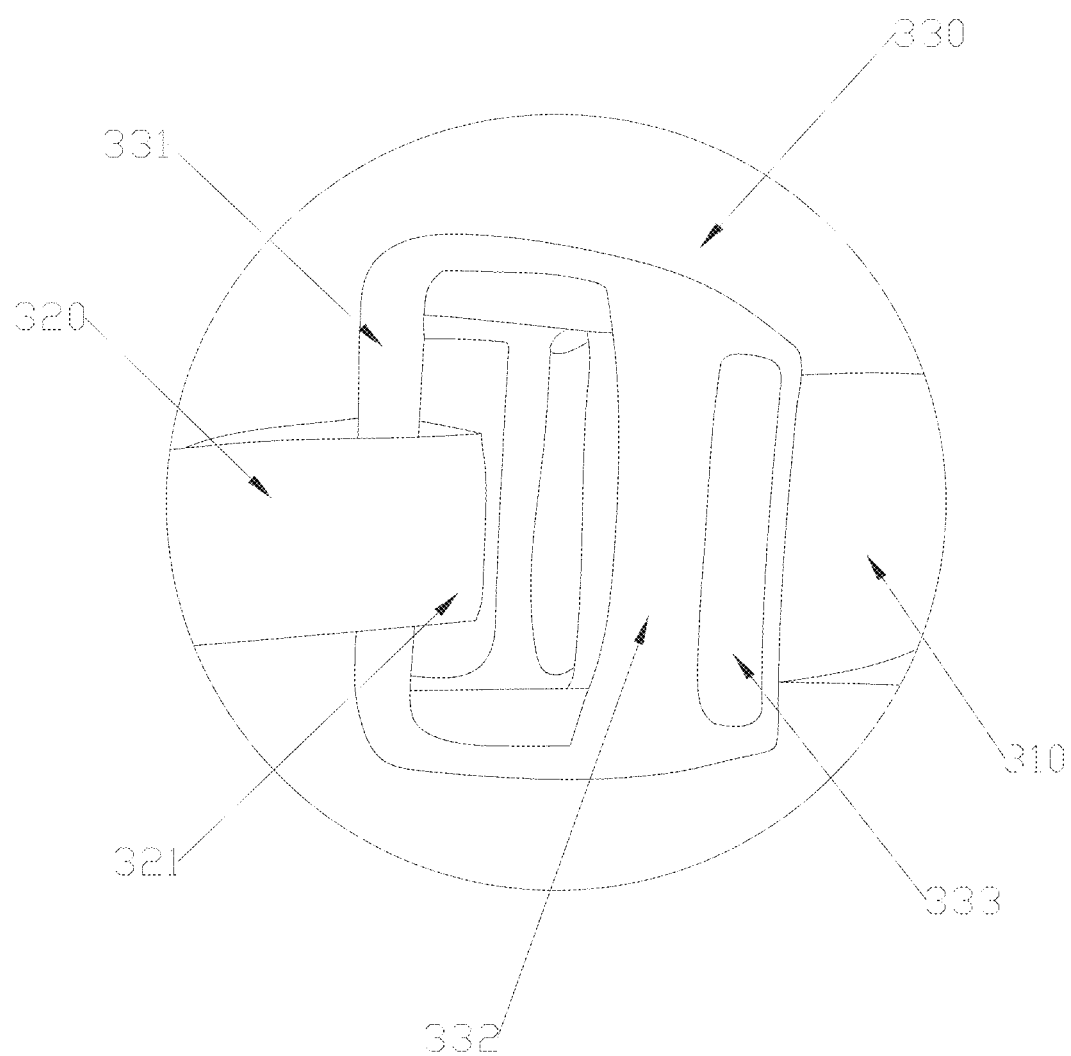
FIG. 12 is an enlarged view of a portion C shown in FIG. 11.

In another embodiment, as shown in FIGS. 11 and 12, the safety tether 300 may also include an auxiliary webbing 360. The auxiliary webbing 360 is disposed side by side with the fixing webbing 320. An end of the auxiliary webbing 360 is disposed with an auxiliary fixing part 370. In this embodiment, two fixing members 200 are disposed in the mounting cavity, and the fixing part 340 and the auxiliary fixing part 370 are fixed on the two fixing members 200 respectively. The other end of the auxiliary webbing 360 is connected to one end of the connecting webbing 310. The other end of the connecting webbing 310 extends through the adjusting part 332. Therefore, in this embodiment, the connecting webbing 310 also includes a use section 311 and an adjusting section 312. A portion of the connecting webbing 310 between the auxiliary webbing 360 and the length adjusting member 330 is referred to as the use section 311, and the other portion of the connecting webbing 310 is referred to as the adjusting section 312. With a connecting part 350 as the boundary, the use section 311 can be further divided into a first section 311a connected to the length adjusting member 330 and a second section 311b connected to the auxiliary webbing 360. Similar to the above embodiment, by pressing the adjusting button 333, the relative position of the adjusting part 332 and the connecting webbing 310 can be adjusted, so that the length of a portion of the connecting webbing 310 between the length adjusting member 330 and the auxiliary webbing 360 can be adjusted. The connecting part 350 is disposed at a portion of the connecting webbing 310 between the length adjusting member 330 and the auxiliary webbing 360. Therefore, a distance between the fixing part 340 and the connecting part 350 can be adjusted through the length adjusting member 330, that is, the degree of the connection tightness of the safety tether 300 between the seat body 100 and the vehicle seat can be adjusted.

Figure 2:
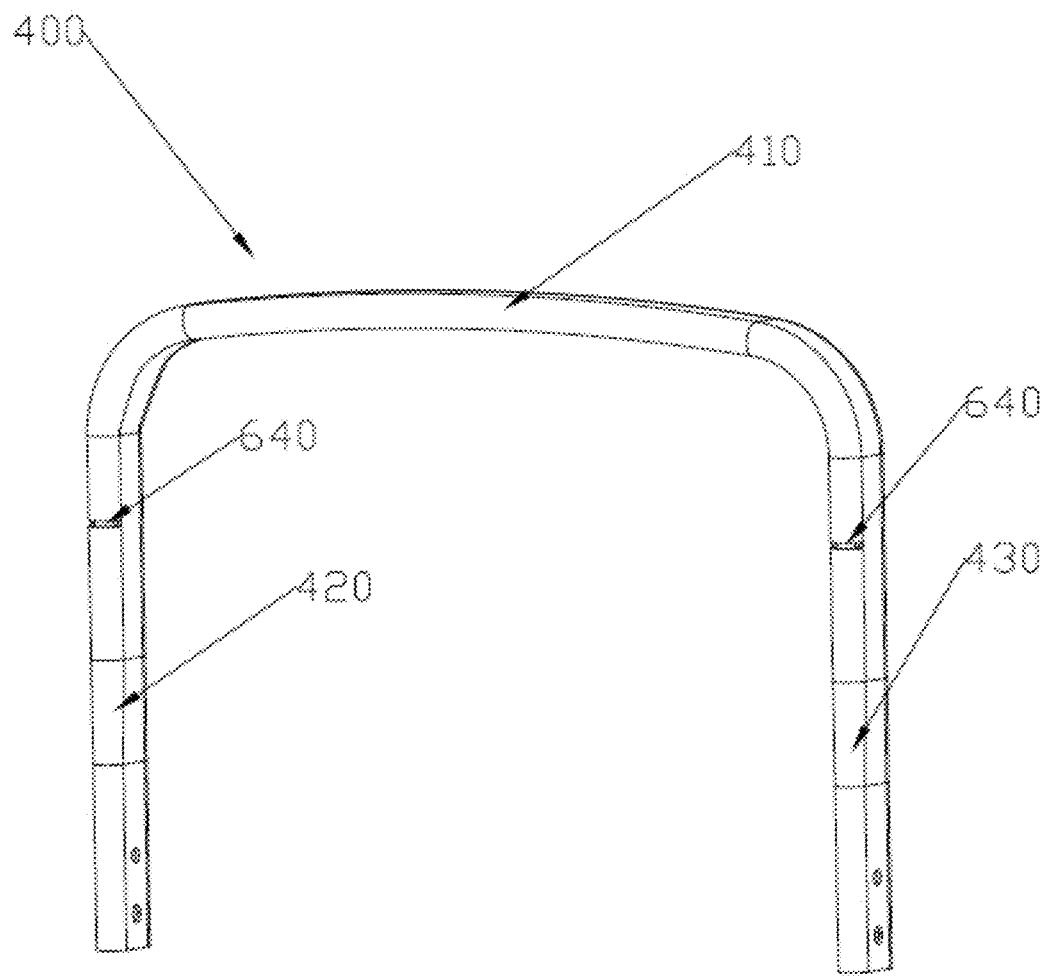
FIG. 2 is a structural schematic view of a fixed tube of the child safety seat shown in FIG. 1.
Figure 3:
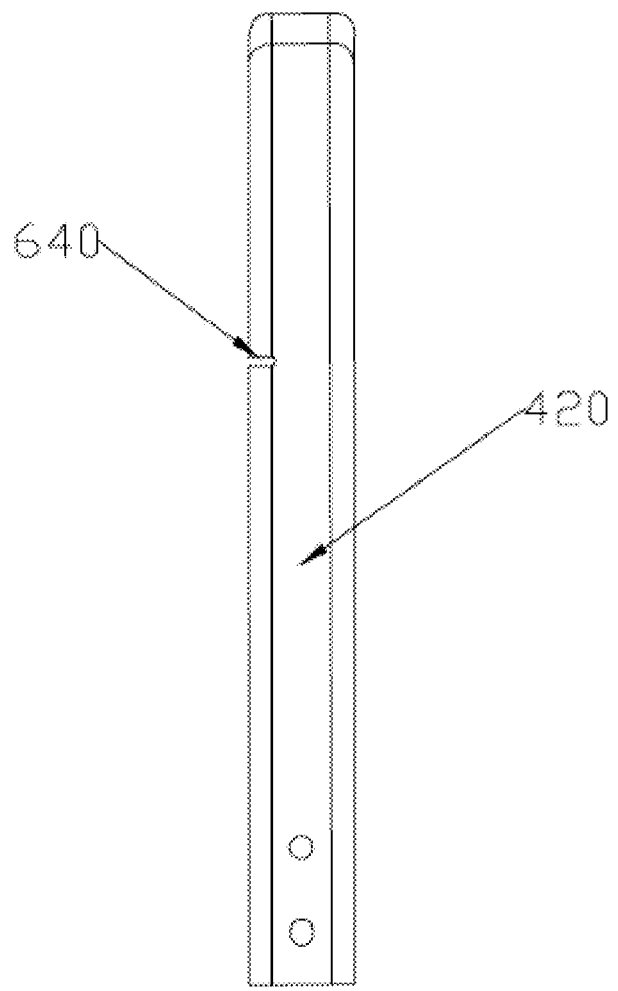
FIG. 3 is a side view of the fixed tube shown in FIG. 2.
Figure 13:
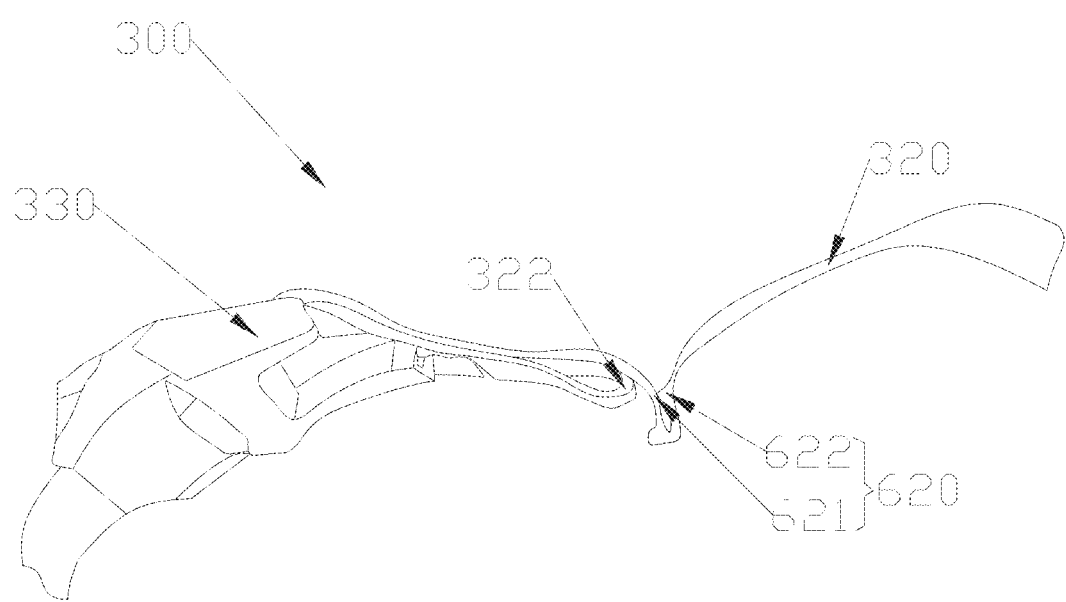
FIG. 13 is a structural schematic view of a safety tether according to another embodiment of the present disclosure.

Further, as shown in FIGS. 1 to 3, the fixed tube 400 is fixed above the seat back 110, and disposed on the seat body 100. The fixed tube 400 is specifically a U-shaped tube, including a horizontal tube 410, and a first side tube 420 and a second side tube 430 that are connected to two ends of the horizontal tube 410. The first side tube 420 and the second side tube 430 are fixed on the top surface of the seat back 110. The limiting ring 500 is disposed on the horizontal tube 410. One end of the safety tether 300 disposed with the connecting part 350 extends through and out of the mounting cavity 111 via the communicating hole, and is wound around the fixed tube via the limiting ring 500 to connect to the vehicle seat 400. As shown in FIG. 13, the fixing webbing 320 is disposed with a limiting collar 322. When the safety tether 300 is wound around the limiting ring 500, the limiting collar 322 is engaged at the limiting ring 500, thereby playing a limiting role in the safety tether 300, so that it prevents the fixing webbing 320 from moving left or right, or sliding toward the seated portion 120.

In an embodiment, as shown in FIGS. 6 and 7, the buffering structure is an elastic pressing block 610 disposed in the mounting cavity 111. In this embodiment, there are two elastic pressing blocks 610, namely a first pressing block 611 and a second pressing block 612. The fixing part 340, which is the fixing collar, is sleeved on the fixing member 200. The first pressing block 611 is disposed between the fixing collar and the fixing member 200, and both the fixing collar and the fixing member 200 are pressed against the first pressing block 611. The second pressing block 612 is disposed between the fixing member 200 and the seat body 100. The first pressing block 611, the fixing member 200, the second pressing block 612, and a part of the seat body 100 are arranged in sequence. The second pressing block 612 includes a first surface 612a, a second surface 612b, and a third surface 612c. The first surface 612a is opposite the second surface 612b, and the third surface 612c is adjacent to both the first surface 612a and the second surface 612b. The fixing member 200 and the seat body 100 abut against the first surface 612a and the second surface 612b respectively, and the safety tether 300 abuts against the third surface 612c. In this way, when the vehicle is subjected to a relatively large impact force, the tensile force applied on the safety tether 300 is first applied on the first pressing block 611 and the second pressing block 612 instead of the fixing member 200 or the seat body 100, such that the first The pressing block 611 and the second pressing block 612 can counteract the tensile force applied on the safety tether 300 by elastic deformation, thereby avoiding deformation or breakage of the safety tether 300 and/or the connection between the safety tether 300 and the vehicle seat, thereby greatly improving the safety performance of the child safety seat.

Optionally, both the first pressing block 611 and the second pressing block 612 can be made of one or more of elastic materials such as rubber, silicon, polyvinyl chloride, polystyrene foam, expanded polypropylene, or expanded polystyrene-polyethylene mixture.

Figure 8:
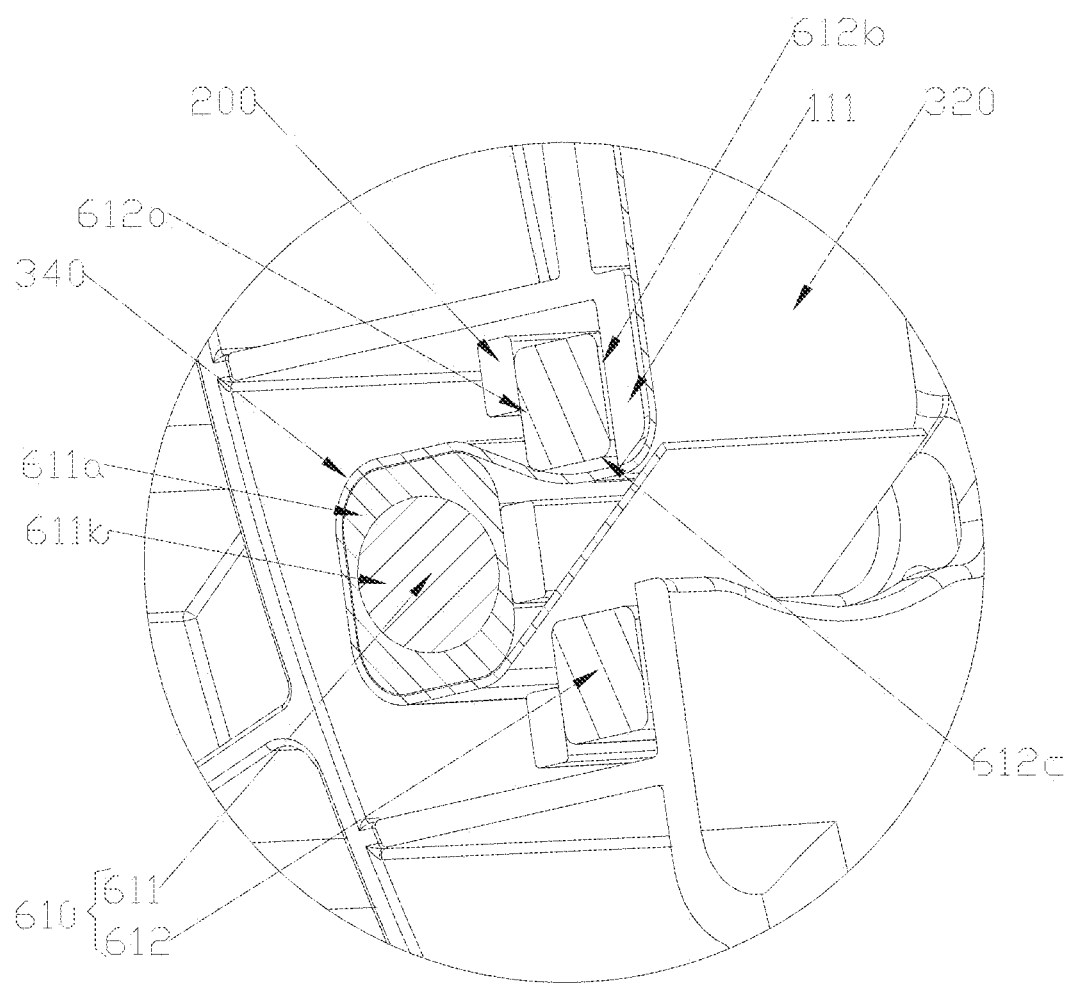
FIG. 8 is another enlarged view of the portion A shown in FIG. 6.

Further, as shown in FIG. 8, the first pressing block 611 may include a first buffering part 611*a* and a second buffering part 611*b*. The first buffering part 611*a* is sleeved outside the second buffering part 611*b*. Both the safety tether 300 and the seat body 100 abut against the first buffering part 611*a*. The first buffering part 611*a* and the second buffering part 611*b* are made of different materials. For example, the elastic deformation capacity of the second buffering part 611*b* may be greater than that of the first buffering part 611*a*, for example, the first buffering part 611*a* may be made of expanded polypropylene, and the second buffering part 611*b* may be made of rubber material, etc.

In this way, when the impact force applied on the vehicle is too large, after the first buffering part 611*a* is crushed, the second buffering part 611*b* can play a further buffering role, thereby further preventing the safety tether 300 and/or the connection between the safety tether 300 and the vehicle seat from being deformed or broken, which improves the safety factor of the child safety seat. Moreover, the first pressing block 611 in this embodiment is formed by the first buffering part 611*a* and the second buffering part 611*b* that are made of different materials, such that there will be large changes of the shear modulus and elastic modulus between the first buffering part 611*a* and the second buffering part 611*b*. Therefore, the tensile force applied on the safety tether 300 will press the first pressing block 611, and dissipate to a greater extent during the process of transmission between the first buffering part 611*a* and the second buffering part 611*b*, and thus compared with the first pressing block 611 made of a single material, the first pressing block 611 in this embodiment have a more superior buffering and energy-absorbing effect. Certainly, the second pressing block 612 can also be similarly formed by connecting two buffering parts made of different materials. In addition, the number and positions of the first pressing block 611 and the second pressing block 612 can also be adjusted as required, as long as they can simultaneously abut against the safety tether 300 and the safety seat body 100 to play the role of buffering and energy-absorbing.

Figure 14:
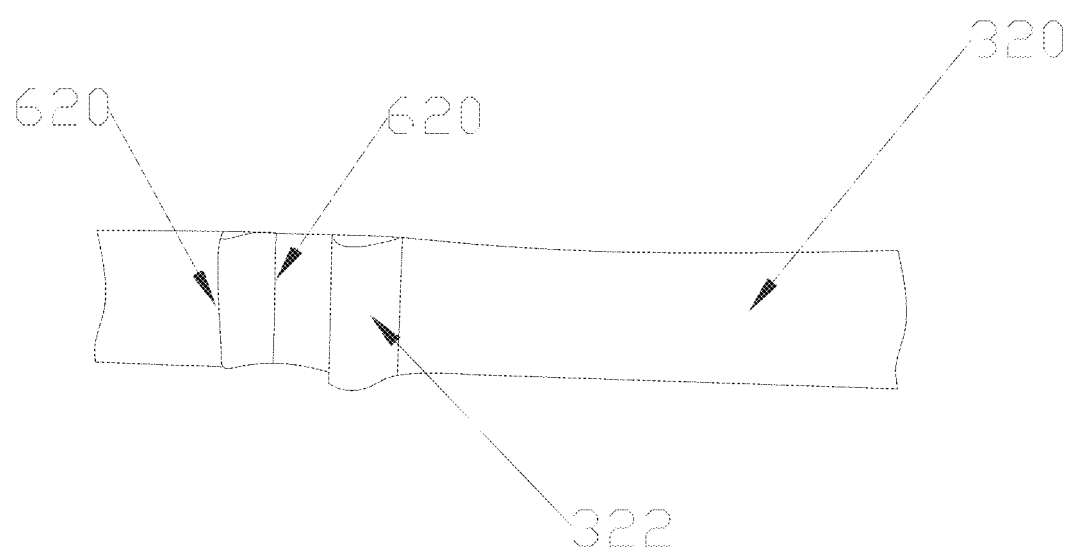
FIG. 14 is a partial view of the safety tether shown in FIG. 13, where a first connecting structure is disposed on a fixing webbing.
Figure 15:
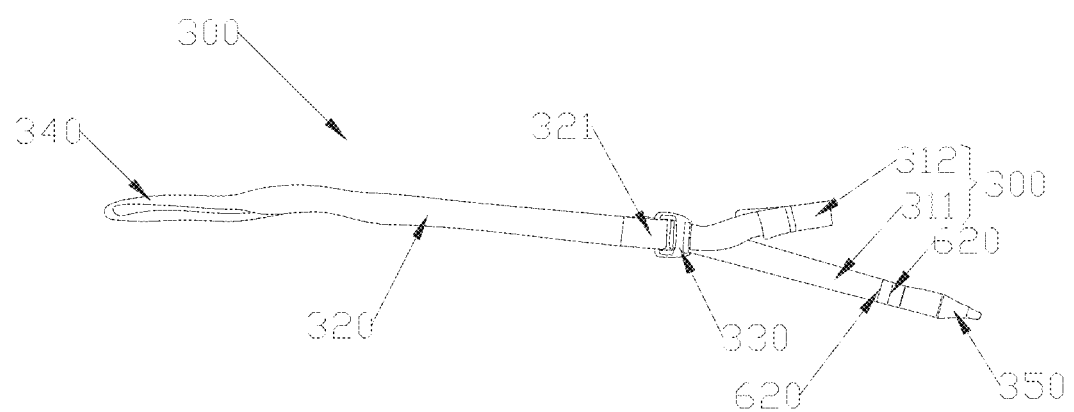
FIG. 15 is another partial view of the safety tether shown in FIG. 13, where a first connecting structure is disposed on a connecting webbing.

In another embodiment, as shown in FIGS. 13 to 15, the buffering structure is a first connecting structure 620 disposed on the safety tether 300. The first connecting structure 620 includes a first connecting part 621 and a second connecting part 622 spaced from each other and both located between the fixing part 340 and the connecting part 350. The first connecting part 621 and the second connecting part 622 are connected and fixed to form the buffering structure. In this embodiment, the first connecting part 621 and the second connecting part 622 are fixedly connected by sewing. Certainly, in other embodiments, the first connecting part 621 and the second connecting part 622 may also be fixedly connected by other means such as gluing. When the vehicle is subjected to a relatively large impact force so that the safety tether 300 is tightened, the connection between the first connecting part 621 and the second connecting part 622 will be first broken, so as to play the role of force release and buffering. To a certain extent, the failure of the effect of the safety tether 300 due to the deformation or breakage of the safety tether 300 and/or the connection between the safety tether 300 and the vehicle seat can be prevented, thereby ensuring the safety and durability of the child safety seat. Additional accessories are not required in the above buffering structure, such that the buffering structure has a simple structure, low cost and is easy to realize.

Figure 17:
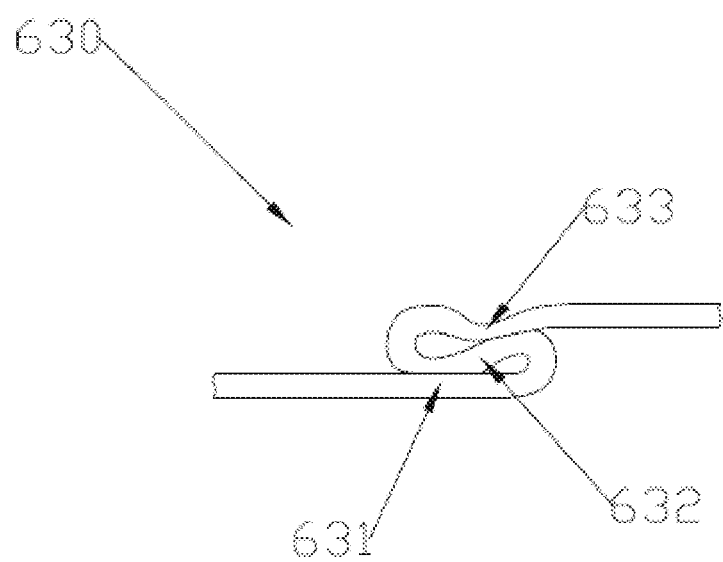
FIG. 17 is a structural schematic view of a second connecting structure.

Certainly, as shown in FIG. 17, the buffering structure may also be a second connecting structure 630 disposed on the safety tether 300. The second connecting structure 630 may include a first connecting section 631, a second connecting section 632, and a third connecting section 633 that are sequentially disposed on the safety tether 300. The first connecting section 631, the second connecting section 632, and the third connecting section 633 are connected and fixed to form the second connecting structure 630. Specifically, the second connecting section 632 is superposed on the first connecting section 631, the third connecting section 633 is superposed on the second connecting section 632, and the first connecting section 631 and the third connecting section 633 are respectively located at both sides of the second connecting section 632. The first connecting section 631, the second connecting section 632, and the third connecting section 633 are fixedly connected to form a "Z"-like second connecting structure 630. Optionally, the first connecting section 631, the second connecting section 632, and the third connecting section 633 may be connected by sewing or gluing. Since the second connecting structure 630 is formed by connecting and fixing three connecting sections, when the vehicle is subject to a relatively large impact force so that the safety tether 300 is tightened, an extension length of the second connecting structure 630 when being broken is greater than a length of the first connecting structure 620, so a better effect of force release and buffering is achieved. Certainly, in other embodiments, the second connecting structure 630 can also be formed by connecting more than three connection sections as needed.

Specifically, the buffering structure in this embodiment may be disposed on the fixing webbing 320, as shown in FIG. 13, or on the connecting webbing 310, as shown in FIG. 15, or on the auxiliary webbing 360, as shown in FIG. 11 (for example, the first connecting structure 620 or the second connecting structure 630 may be disposed at a position D or E in the figure). It should be noted that, since the length of the connecting webbing 310 is adjustable, the first connecting structure 620 or the second connecting structure 630 needs to be disposed on the portion of the connecting webbing 310 between the connecting part 350 and the length adjusting member 330, the buffering effect can be achieved. For example, the first connecting structure 620 or the second connecting structure 630 can be disposed at a position within about 15 centimeters from the connecting part 350, so as to ensure that the first connecting structure 620 or the second connecting structure 630 is always located at the portion of the connecting webbing 310 that is in use.

Figure 16:
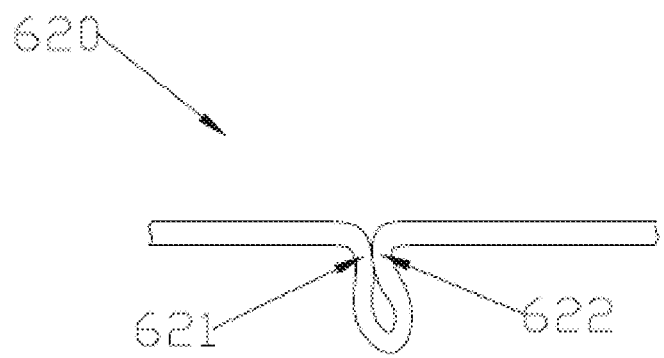
FIG. 16 is a structural schematic view of the first connecting structure.

Further, as shown in FIGS. 14 and 16, a plurality of first connecting parts 621 and a plurality of second connecting parts 622 may be disposed on the safety tether 300. The plurality of first connecting parts 621 and the plurality of second connecting parts 622 are connected and fixed in one-one correspondence, to form a plurality of buffering structures. Similarly, a plurality of second connecting structures 630 may also be provided. In this way, multi-level buffering can be formed, the ability of the safety tether 300 to release force and buffer can be improved, and the deformation or breakage of the safety tether 300 and/or the connection between the safety tether 300 and the vehicle seat can be well avoided, thereby greatly improving the safety performance of the child safety seat.

Further, different numbers or different types of connecting structures can be disposed on the safety tether 300 as required. For example, as shown in FIG. 11, in the safety tether 300 including the auxiliary webbing 360, the first connecting structures 620 may be disposed at the position D of the fixing webbing 320 and the position E of the auxiliary webbing 360; or the second connecting structures 630 may be disposed at the position D of the fixing webbing 320 and the position E of the auxiliary webbing 360. Or, the first connecting structure 620 may be disposed at the position D of the fixing webbing 320, and the second connecting structure 630 may be disposed at the position E of the auxiliary webbing 360. Or, the second connecting structure 630 may be disposed at the position D of the fixing webbing 320, and the first connecting structure 620 may be disposed at the position E of the auxiliary webbing 360.

In yet another embodiment, as shown in FIGS. 2 and 3, the buffering structure may also be a notch 640 disposed on the fixed tube 400. In this way, when the vehicle is subjected to a relatively large impact force, the tension force applied on the safety tether 300 winding around the fixed tube 400 will be transferred to the fixed tube 400, and in this case, the fixed tube 400 defining the notch 640 can be deformed to a certain extent, so as to achieve a certain force-release and energy-absorbing effect, and to a certain extent, the deformation of the safety tether 300 under the action of the tension force can be avoided. As a result, it is possible to prevent the failure of the effect of the safety tether 300 on the seat body 100, thereby ensuring the effect of the safety tether 300. Specifically, the notch 640 may be disposed on the first side tube 420 or the second side tube 430, to prevent hands from being cut. Certainly, a plurality of notches 640 may be provided at intervals, but in order to ensure the strength, not too many notches 640 need to be provided, which can be determined depending on specific situations.

Figure 5:
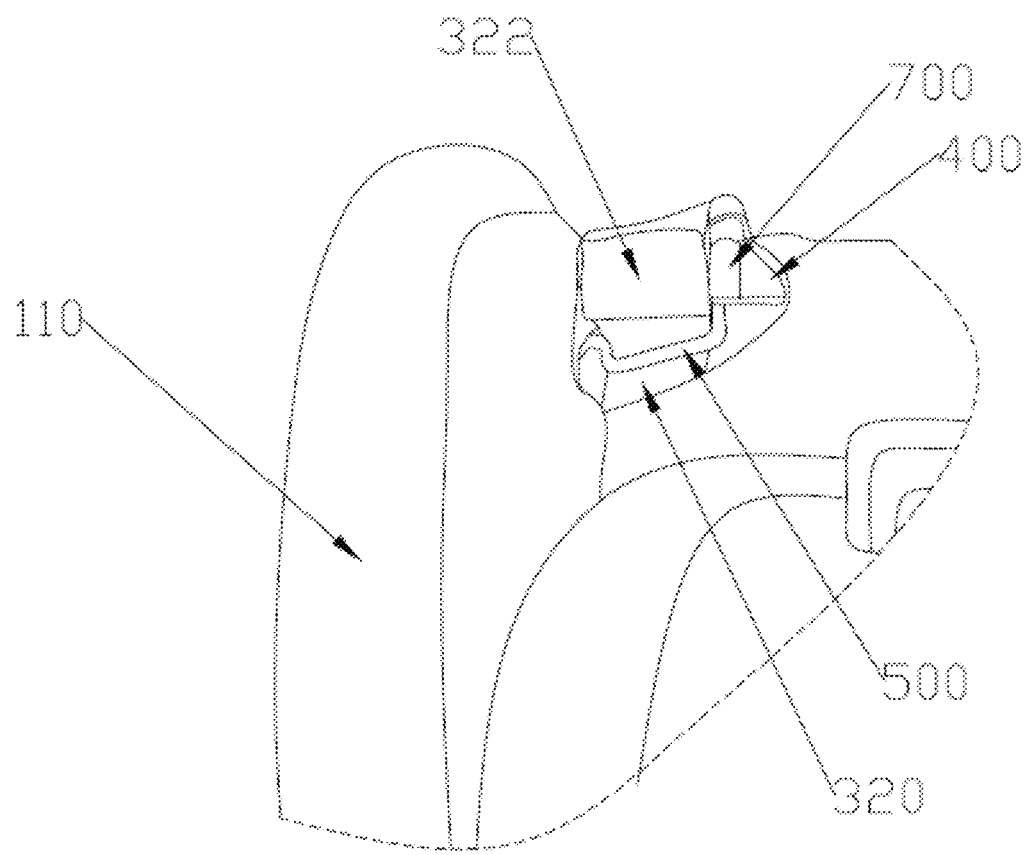
FIG. 5 is a partial enlarged view of the child safety seat shown in FIG. 4.

In yet another embodiment, the buffering structure may also be a buffering block disposed at the fixed tube 400, the limiting ring 500, or the mounting hole, around which the safety tether 300 winds. For example, as shown in FIG. 5, the buffering structure may be a first buffering pressing block 700 disposed on the fixed tube 400, and the safety tether 300 abuts against the first buffering pressing block 700. The buffering structure can also be a second buffering pressing block disposed on the limiting ring 500. A through hole is disposed on the second buffering pressing block, and the safety tether 300 extends out from the through hole when winding around the fixed tube 400. The buffering structure can also be a third buffering pressing block disposed around the mounting hole, and the safety tether 300 abuts against the third buffering pressing block. In this way, when the vehicle is subjected to a relatively large impact force, a corresponding portion of the safety tether 300 will first abut against the first buffering pressing block 700, the second buffering pressing block, or the third buffering pressing block, which can play a certain role in buffering and absorbing energy. As such, the tension force applied on the safety tether 300 can be prevented from being directly applied on the fixed tube 400, the limiting ring 500, and the seat body 100, thereby avoiding the failure of the position-limiting effect of the safety tether 300 on the safety seat body 100 due to the portability of the fixed tube 400, the limiting ring 500, and the seat body 100, thereby improving the safety performance of the child safety seat. In this embodiment, the first buffering pressing block 700, the second buffering pressing block, and the third buffering pressing block are all made of polystyrene foam. Of course, in other embodiments, the first buffering pressing block 700, the second buffering pressing block, and the third buffering pressing block can also be made of rubber, silicon, polyvinyl chloride, expanded polypropylene, or expanded polystyrene polypropylene mixture, etc.

Figure 18:
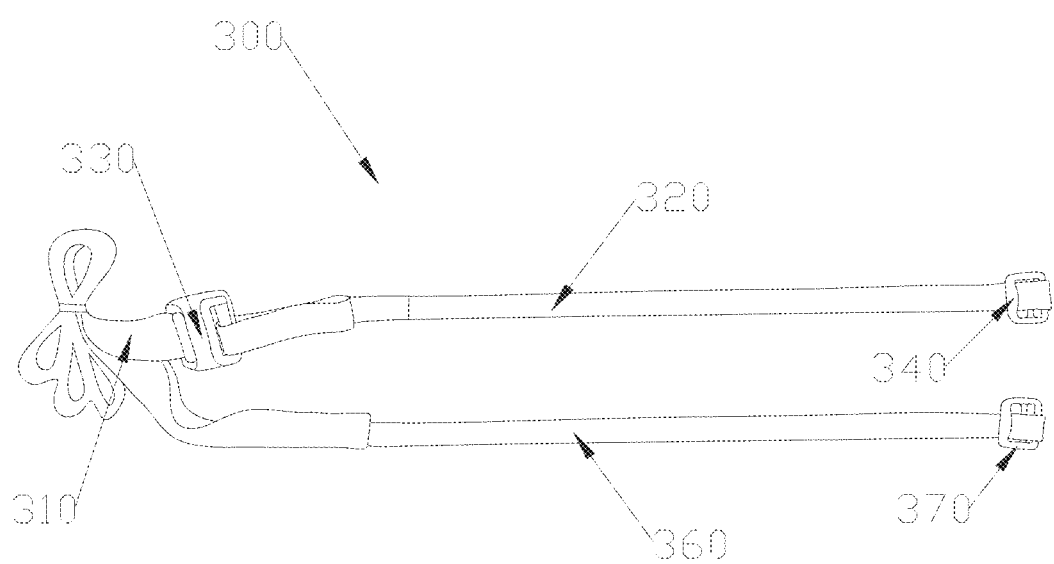
FIG. 18 is a structural schematic view of a safety tether according to a further embodiment of the present disclosure.

In a further embodiment, as shown in FIG. 18, a width of the fixing webbing 320 may also be set to be less than a width of the connecting webbing 310, so that the fixing webbing 320 forms the buffering structure. By reducing the width of the fixing webbing 320, the elongation of the fixing webbing 320 can be increased, so as to achieve the buffering and energy-absorbing effect. The width of the fixing webbing 320 may be in a range from, for example, 15 mm to 30 mm. In this embodiment, the width of the fixing ribbon 320 is 25 mm. Certainly, the width of the fixing ribbon 320 can also be 15 mm, 16 mm, 17 mm, 18 mm, 19 mm, 20 mm, 21 mm, 22 mm, 23 mm, 24 mm, 25 mm, 26 mm, 27 mm, 28 mm, 29 mm, 30 mm, etc.

The above child safety seat has at least the following technical effects.

The above safety tether 300 is fixed to the seat body 100 through the fixing part 340, and is connected to the vehicle seat through the connecting part 350, so that the seat body 100 can be fixed on the vehicle seat. In addition, the buffering structure is disposed on the safety tether 300 or the seat body 100 to enhance the buffering and energy-absorbing effect of the safety belt 300, that is, to reduce the tension force applied on the safety tether 300 and/or the connection between the safety tether 300 and the vehicle seat. In this way, when the vehicle is subjected to a relatively large impact force, the buffering structure can counteract part of the impact force, avoiding deformation or breakage of the safety tether 300 and/or the connection between the safety tether 300 and the vehicle seat, so as to ensure the effect of the safety tether 300, thereby improving the safety performance of the child safety seat greatly.

The technical features of the above-described embodiments can be combined arbitrarily. To simplify the description, not all possible combinations of the technical features in the above embodiments are described. However, all of the combinations of these technical features should be considered as being fallen within the scope of the present disclosure, as long as such combinations do not contradict with each other.

The foregoing embodiments merely illustrate some embodiments of the present disclosure, and descriptions thereof are relatively specific and detailed. However, it should not be understood as a limitation to the patent scope of the present disclosure. It should be noted that, a person of ordinary skill in the art may further make some variations and improvements without departing from the concept of the present disclosure, and the variations and improvements falls in the protection scope of the present disclosure. Therefore, the protection scope of the present disclosure shall be subject to the appended claims.

What is claimed is:

1. A child safety seat comprising:
   a seat body;
   a safety tether comprising a fixing part and a connecting part, the fixing part being fixed on the seat body, and the connecting part being connected to a vehicle seat;
   a buffering structure disposed on the seat body to reduce a tension force applied on the safety tether; and
   a fixing member disposed in the seat body,
   wherein the fixing part comprises a fixing collar, the fixing collar extends through the fixing member and is sleeved on the fixing member, and the buffering structure abuts against the fixing member and the fixing collar.

2. The child safety seat according to claim 1, wherein the buffering structure comprises an elastic pressing block, and both the safety tether and the seat body abut against the elastic pressing block.

3. The child safety seat according to claim 2, wherein the elastic pressing block comprises a first pressing block, and both the fixing collar and the fixing member abut against the first pressing block.

4. The child safety seat according to claim 3, wherein the elastic pressing block further comprises a second pressing block, and each of the fixing member, the seat body, and the safety tether abuts against the second pressing block.

5. The child safety seat according to claim 2, wherein the elastic pressing block is made of rubber, silicon, polyvinyl chloride, polystyrene foam, expanded polypropylene, or expanded polystyrene-polyethylene mixture.

6. The child safety seat according to claim 2, wherein the elastic pressing block comprises a first buffering part and a second buffering part, the first buffering part is sleeved on the second buffering part, and both the safety tether and the seat body abut against the first buffering part.

7. The child safety seat according to claim 6, wherein the elastic deformation capacity of the second buffering part is greater than that of the first buffering part.

8. The child safety seat according to claim 1, wherein a first connecting section, a second connecting section, and a third connecting section are disposed on the safety tether, and the first connecting section, the second connecting section, and the third connecting section are connected and fixed to form the buffering structure.

9. The child safety seat according to claim 8, wherein the first connecting section is superposed on a surface of the second connecting section, and the third connecting section is superposed on another surface of the second connecting section.

10. The child safety seat according to claim 1, further comprising a fixed tube disposed on the seat body;
wherein the safety tether is wound around the fixed tube to connect to the vehicle seat, the buffering structure is a first buffering pressing block disposed on the fixed tub, and the safety tether abuts against the first buffering pressing block.

11. The child safety seat according to claim 10, further comprising a fixed tube disposed on the seat body;
wherein the safety tether is wound around the fixed tube to connect to the vehicle seat;
wherein a limiting ring is disposed on the fixed tube, a limiting collar is disposed on the safety tether, and when the safety tether is wound around the fixed tube, the limiting collar is engaged at the limiting ring; and
wherein the buffering structure is a second buffering pressing block disposed on the limiting ring; a through hole is disposed on the second buffering pressing block; and the safety tether extends out from the through hole when winding around the fixed tube.

12. The child safety seat according to claim 11, wherein the seat body comprises a mounting cavity, and a mounting hole communicating with the mounting cavity;
wherein a fixing member is disposed in the mounting cavity, an end of the safety tether comprising the fixing part extends into the mounting cavity through the mounting hole, to be fixed on the fixing member; and
wherein the buffering structure is a third buffering pressing block disposed around the mounting hole, and the safety tether abuts against the third buffering pressing block.

13. A child safety seat comprising:
a seat body;
a safety tether comprising a fixing part and a connecting part, the fixing part being fixed on the seat body, and the connecting part being connected to a vehicle seat; and
a buffering structure disposed on the safety tether to reduce a tension force applied on the safety tether,
wherein a first connecting part and a second connecting part are arranged on the safety tether and spaced from each other, and the first connecting part and the second connecting part are connected and fixed to form the buffering structure; and
wherein the first connecting part and the second connecting part are fixedly connected by sewing, to form the buffering structure.

14. The child safety seat according to claim 13, wherein a plurality of first connecting parts and a plurality of second connecting parts are provided, and the plurality of first connecting parts and the plurality of second connecting parts are connected and fixed in one-one correspondence, to form a plurality of buffering structures.

15. The child safety seat according to claim 13, wherein the safety tether comprises a fixing webbing and a connecting webbing, and the fixing webbing and the connecting webbing are connected by a length adjusting member;
wherein an end of the fixing webbing away from the length adjusting member is disposed with the fixing part, and an end of the connecting webbing away from the length adjusting member is disposed with the connecting part; and
wherein the length adjusting member is configured to adjust the length of a portion of the connecting webbing between the connecting part and the length adjusting member.

16. The child safety seat according to claim 15, wherein the buffering structure is disposed on the fixing webbing.

17. The child safety seat according to claim 15, wherein the buffering structure is disposed on the connecting webbing, and located between the connecting part and the length adjusting member.

18. A child safety seat comprising:
a seat body;
a safety tether comprising a fixing part and a connecting part, the fixing part being fixed on the seat body, and the connecting part being connected to a vehicle seat;
a buffering structure disposed on the seat body to reduce a tension force applied on the safety tether; and
a fixed tube disposed on the seat body;
wherein the safety tether is wound around the fixed tube to connect to the vehicle seat, and the buffering structure is a notch disposed on the fixed tube.

19. A child safety seat comprising:
a seat body;
a safety tether comprising a fixing part and a connecting part, the fixing part being fixed on the seat body, and the connecting part being connected to a vehicle seat; and
a buffering structure disposed on the safety tether to reduce a tension force applied on the safety tether,
wherein the safety tether comprises a fixing webbing and a connecting webbing, and the fixing webbing and the connecting webbing are connected by a length adjusting member;
wherein an end of the fixing webbing away from the length adjusting member is disposed with a fixing part, an end of the connecting webbing away from the length adjusting member is disposed with the connecting part, and the length adjusting member is configured to adjust the length of a portion of the connecting webbing between the connecting part and the length adjusting member; and wherein a width of the fixing webbing is less than a width of the connecting webbing, so that the fixing webbing forms the buffering structure.

20. The child safety seat according to claim 19, wherein the width of the fixing webbing is in a range from 15 mm to 30 mm.

\* \* \* \* \*